(12) United States Patent
Mathew et al.

(10) Patent No.: US 11,544,264 B2
(45) Date of Patent: Jan. 3, 2023

(54) DETERMINING QUERY JOIN ORDERS

(71) Applicant: HEWLETT PACKARD ENTERPRISE DEVELOPMENT LP, Houston, TX (US)

(72) Inventors: Shine Mathew, Karnataka (IN); Ilavaluthy Mahendran, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 66 days.

(21) Appl. No.: 16/862,232

(22) Filed: Apr. 29, 2020

(65) Prior Publication Data
US 2021/0342351 A1    Nov. 4, 2021

(51) Int. Cl.
*G06F 16/2453*    (2019.01)

(52) U.S. Cl.
CPC .............. *G06F 16/24544* (2019.01)

(58) Field of Classification Search
CPC ................................................ G06F 16/24544
See application file for complete search history.

(56) References Cited

U.S. PATENT DOCUMENTS

| | | | |
|---|---|---|---|
| 6,138,111 A | 10/2000 | Krishna | |
| 6,934,699 B1 * | 8/2005 | Haas ................. | G06F 16/24545 |
| 7,512,600 B2 | 3/2009 | Al-Omari et al. | |
| 9,460,153 B2 | 10/2016 | Gruszecki et al. | |
| 2006/0282423 A1 * | 12/2006 | Al-Omari ......... | G06F 16/24544 |
| 2007/0219951 A1 * | 9/2007 | Ahmed ............. | G06F 16/24544 |
| 2008/0114721 A1 * | 5/2008 | Jones ................. | G06F 16/3338 |
| 2009/0070313 A1 * | 3/2009 | Beyer ................. | G06F 16/24 |
| | | | 707/999.005 |
| 2011/0055199 A1 * | 3/2011 | Siddiqui ............ | G06F 16/2456 |
| | | | 707/E17.017 |
| 2021/0240710 A1 * | 8/2021 | Korlapati .......... | G06F 16/24537 |

OTHER PUBLICATIONS

Zhou et al., "Optimizing continuous multijoin queries over distributed streams" CIKM '05: Proceedings of the 14th ACM international conference on Information and knowledge managementOct. 2005, pp. 221-222https://doi.org/10.1145/1099554.1099597 (Year: 2005).*

Zhou et al., "Optimizing Continuous Multijoin Queries over Distributed Streams" teaches in p. 222 col. 2.2.2.2 a multi-join on different attributes p. 221-222 (Year: 2005).*

C. Estan, et al., "End-biased Samples for Join Cardinality Estimation", Data Engineering 2006. ICDE '06. Proceedings of the 22nd International Conference.

* cited by examiner

*Primary Examiner* — Mark D Featherstone
*Assistant Examiner* — Kweku William Halm
(74) *Attorney, Agent, or Firm* — Trop, Pruner & Hu, P.C.

(57) ABSTRACT

A technique includes identifying a plurality of substitute candidates for a given multiple join of tables. Each substitute candidate includes a candidate multiple join of tables, and the number of tables of each candidate multiple join is less than the number of tables of the given multiple join. A given substitute candidate is selected based on a cardinality of the candidate multiple join of the given substitute candidate; a join order for the given multiple join is determined based on the given substitute candidate; and the query is processed based on the determined join order.

16 Claims, 6 Drawing Sheets

DETERMINING QUERY JOIN ORDERS

BACKGROUND

A typical business enterprise may have organized collections of data, or databases, and for purposes of managing the storage, modification and retrieval of the corresponding data, the business enterprise may have set of software called a "database management system," or "DBMS." As an example, the databases may be relational databases. In a relational database, the data is stored in in tables, and each table is organized in rows and columns. Tables in a relational database may be related based on data common to the tables. The enterprise may use a set of software, called a "relational DBMS," or "RDBMS," to access the relational database for purposes of storing, retrieving and modifying data. More specifically, data of the relational database may be accessed through use of requests, or queries. The queries may, for example, be query statements that are structured according to a particular format (e.g., a structured language (SQL) query format)). As an example, a SQL query statement may contain a SELECT command to request information from one or multiple tables of a relational database and return the requested information in the form of a new table.

DETAILED DESCRIPTION

An RDBMS may contain a query processor that executes operations to access, store and modify data in a relational database in response to queries that are received by the RDBMS. More specifically, the query processor may, for a given query statement (e.g., a SQL query statement) that represents a query, transform the query statement into a sequence of operations according to a query plan; and the query processor may then execute the sequence of operations to provide a query result.

A query statement may be represented as an expression of one or multiple relational algebraic operators (e.g., set operators, such as union and intersection operators and relational operators, such as join and select operators) and one or multiple aggregation operators (e.g., sort by and group by operators). Moreover, the expression may be represented by a relational expression tree. The internal nodes of the relational expression tree represent the operators, and the leaves of the relational expression tree represents relations. For example, a SQL JOIN of Table A and Table B may be represented, in a relational expression tree, by a JOIN node that has one leaf representing Table A and another leaf representing Table B.

In general, a query statement may potentially be processed in many different ways by the query processor, and each of these ways may be referred to as a potential, or candidate, "query plan." In this context, a "query plan" generally refers to a sequence of operations that are executed in response to a query (e.g., a query expressed as a query statement) to provide a result (herein called a "query result"). A query plan may be represented by a relational expression tree, with each operator of the relational expression tree being annotated with additional information, such as an algorithm and index to be used in the execution of the operator.

The query processor may contain a query optimizer (also called a "query optimizer engine" herein), which may, for a given query, select a query plan, which is then executed by an execution engine of the query processor. The selected query plan may be one of potential multiple query plans that could be executed to provide a query result. These alternative query plans, although providing the same query result, may be associated with different query execution performances. For example, the execution of query plan A may be associated with a relatively large allocated memory footprint due to a relatively large number of rows, or records, that are processed in arriving at the final query result. The execution of query plan B may be associated with a relatively longer processing time due to a relatively large number of operators; the execution of query plan C may be associated with a relatively large allocated memory footprint and processing time; and so forth.

In accordance with example implementations, a goal of the query optimizer is to, for a given query, determine or select a query plan (called an "optimal query plan") that may be efficiently executed by the execution engine. In this context, the efficient execution of the query plan may be measured by any of a number of performance criteria alone or in combination, such as a memory allocation, a processing time, as well as other and/or different performance criteria.

As an example, a query statement may contain a join command that requests the combining of records, or rows, of multiple tables. In SQL, there are six types of joins, including the following: an inner join, which may be invoked using an INNER JOIN command (or a JOIN command with the use of "INNER" being optional); a left outer join command, which may be invoked using a LEFT OUTER JOIN command (or a LEFT JOIN command with the use of "OUTER" being optional); a right outer join, which may be invoked using a RIGHT OUTER JOIN command (or a RIGHT JOIN command with the "OUTER" being optional); and a full join which may be invoked using the FULL JOIN command. It is noted that an inner join may also be invoked without an explicit INNER JOIN or JOIN command when multiple tables following the FROM keyword in the SQL query statement. SQL also includes a SEMI JOIN and ANTI SEMI JOIN.

For a two table join, the "left" connotation refers to the first, or left side, table that follows the join command in the query statement; and the "right" connotation refers to the second, or right side, table that follows the join command in the query statement. In general, a SQL query statement may set forth a join condition, which is a column field-based matching criteria for selecting table records, or rows, for the corresponding query result. An inner join selects rows, or records, from both tables (or all of more than two tables if more tables than two are specified in the join), which are identified by the join condition. A left outer join selects records that from the left table, which match records of the right table according to the join condition. A right outer join selects records from the right table, which match records in the left table according to the join condition. A full outer join selects all records of all tables specified in the join, regardless of any join criteria. The American National Standards Institute (ANSI) SQL standard sets forth a syntax for joins in more detail, and in accordance with example implementations, the joins may comply with the ANSI SQL standard. Moreover, the ANSI SQL standard defines the behavior of each type of join.

As a more specific example, the following SQL query statement sets forth an inner join to select all records from tables T1, T2, T3 and T4 based on a join condition:

SELECT*FROM T1, T2, T3, T4 WHERE T1.a=T2.a AND T3.a=T4.a

It is noted that for this example, the inner join is impliedly invoked due to multiple tables following the FROM keyword. The join condition is specified after the WHERE keyword. In other words, for this example, the join condition is that for a record, or row, to be selected, the column an entry of Table T1 is to match the column a of Table T2 and column a of Table T3 is to be match column a of Table T4. Processing the query statement involves processing single join operators (where in this context, a "single join operator" refers to a join of two tables), and accordingly, the query statement may be represented by multiple relational expression trees, as the joins represented by the single join operators may occur in different orders.

The query processor may process an inner join, such as the four table join that is set forth in the example above, such as the four table join that is set forth in the example above, using multiple single join operators. Moreover, in accordance with SQL, the example query statement above does not specify a join order. In other words, the order in which the T1, T2, T3 and T4 tables appear in the query statement has no bearing on the particular join order in which the query processor joins the T1, T2, T3 and T4 tables via single join operator joins. Although, regardless of the join order selected, the same number of records are returned in the final query result, the join order that is selected may have a significant impact on the overall query processing performance, as the particular join order affects the number of intermediate records that returned and processed by the query processor in arriving at the final query result.

The join order (i.e., the number of ways in which the tables may be joined via single join operators) may be significant, even for a relatively small number (e.g., 10) of tables. A query that joins two tables (e.g., Table T1 and Table T2) using an inner join may be executed according to one of two join orders. When the number of tables of an inner join increases to three, the number of possible join orders becomes six. For an inner join of four tables (as set forth in the example above), the number increases to twenty-four. In general, as the number of tables in an inner join increases, the number of possible join orders increases exponentially, i.e., for an inner join of n tables, the number of possible join orders is n!.

Accordingly, part of the optimizer's task in selecting a query plan for a query statement that includes a join is to select a query plan that has an optimal join order. It is noted that in selecting a query plan, the optimizer may consider criteria other than a join order. For example, the optimizer may consider the algorithm(s) to be used for the joins. For example, a merge join algorithm may be used to join two tables that contain all the same keys. A loop join algorithm involves a processing loop that traverses a relatively smaller table to find records corresponding to matching columns in a relatively larger table. A hash join algorithm involves creating a hash table for one table being joined based on the matching columns and then reading the other table being joined and probing the hash table for matches. The particular join algorithm that results in the best execution performance may depend on a number of factors, such as the absolute sizes of the tables, the relative size of one table relative to the other, the sorting of the columns, whether both tables contain the matching keys, and so forth.

One way for an optimizer to identify an optimal join order is for the optimizer to enumerate all possible join orders, estimate the cardinality for each join order (i.e. estimate the number of records returned in the processing of the join according to the join order), and select the join order that has the smallest cardinality. However, even for a join that involves a relatively small number of tables (e.g., a join of 10 tables) the optimizer may take a relatively long time to identify the optimal join order, and the optimizer may possibly run out of available memory and not end up producing a query plan. In other words, identifying an optimal join order in a process that involve enumerating all possible join orders may result in poor query pre-processing performance or even a complete outage of business applications.

Another approach to optimize queries, such as queries involving joins, is for the optimizer to use an algorithm that identifies certain relational expression tree shapes, or patterns, such as star patterns, snowflake patterns, and so forth. However, for queries that do not follow any of these patterns, the optimizer may resort to enumerating all possible join orders, therefore encountering the challenges mentioned above.

In accordance with example implementations that are described herein, an optimizer engine for a database, such as an optimizer of an RDBMS, applies a relatively efficient enumeration technique (called an "efficient enumeration technique" herein) to determine an optimal join order. As described herein, in this relatively efficient enumeration technique, the optimizer performs a significantly smaller number of enumerations, or iterations, than would be performed by enumerating all possible join orders. Accordingly, fewer resources (e.g., memory resources and/or computing resources) are consumed by the optimizer in determine the optimal join order.

In accordance with example implementations, for the first iteration of the processing loop of the efficient enumeration technique, the optimizer generates a relational expression tree for the query, which contains one or multiple multijoin operator nodes. In this context, a "multijoin" refers to a join (e.g., an inner join) of three or more datasets (e.g., an inner join of three or more tables), and the multijoin operator is a node of the relational expression which represents the multijoin. The optimizer considers candidate substitutes for the multijoin operator, where substitute is a relational expression tree that is equivalent to the multijoin operator. In this context, "equivalent" means that the substitute is another way of expressing the multijoin operator, although the number of records returned in processing one candidate substitute may differ from the number of records returned in processing another candidate substitute.

More specifically, in accordance with example implementations, to form a given candidate substitute for a first multijoin operator, the optimizer removes a table from the first multijoin operator and to create a corresponding relational expression tree (i.e., the given candidate substitute) that contains a new multijoin operator (assuming three or more tables are still being joined) that joins the remaining tables (and forms a node of the created tree) and a single join operator (which form a node of the tree) that joins the removed table with the new multijoin operator. In a similar manner, the optimizer creates the other candidate substitutes, with each substitute candidate corresponding to a single join of another removed table with a multijoin of the other tables.

The optimizer may then, in accordance with example implementations, using statistics to estimate a cardinality, or number of records returned, for each candidate substitute and select the candidate substitute that has the smallest estimated cardinality. The selected candidate substitute has a corresponding multijoin, which may then be further decomposed in another iteration of the processing loop, which proceeds similar to the first iteration. In accordance with example implementations, the enumerations, or iterations, of the processing loop end when there are no more multijoins in the selected candidate substitute to process; and at this point, the optimal join order (corresponding to the candidate substitute on the last iteration) has been selected.

Figure 1:
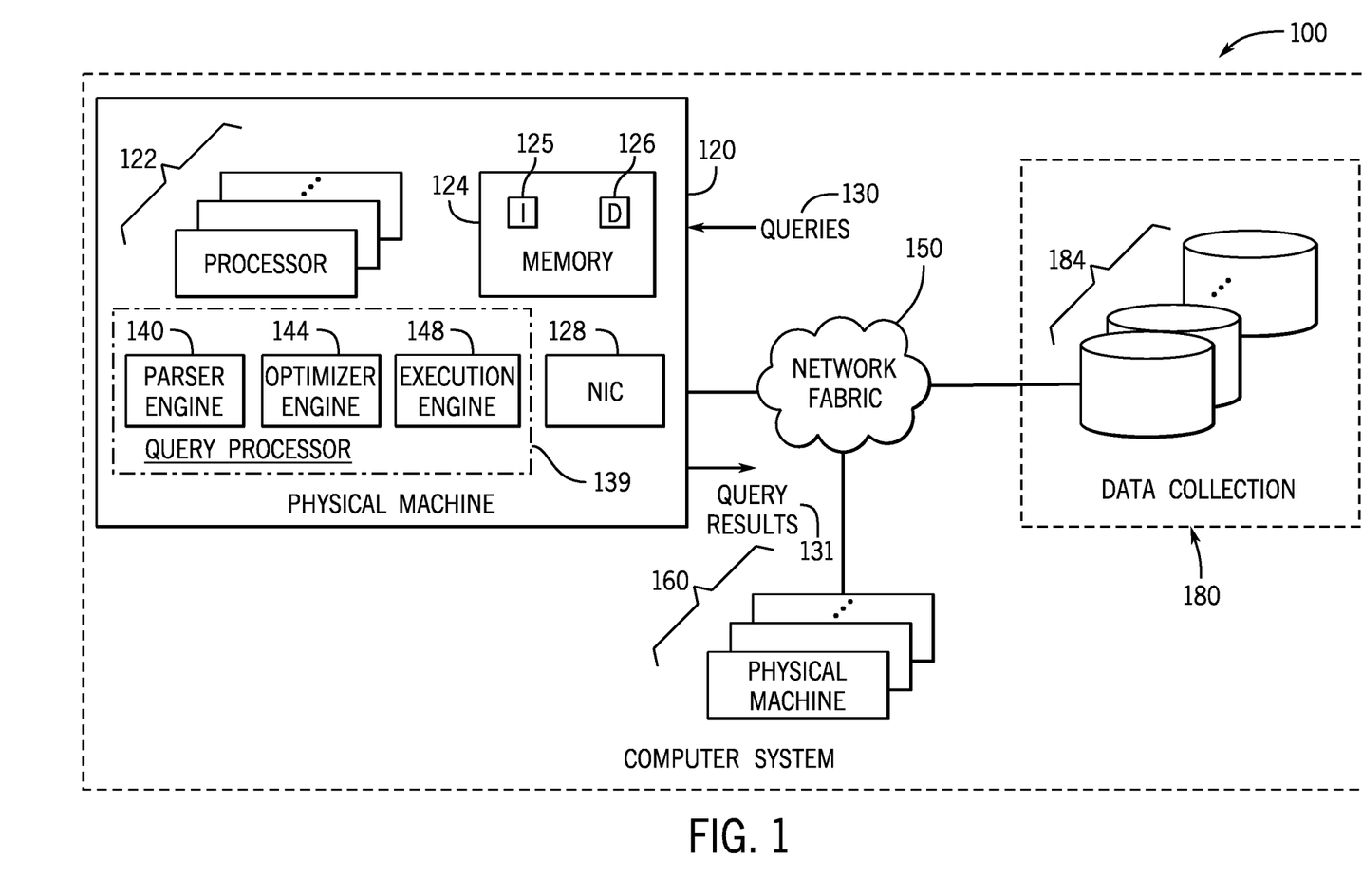
FIG. 1 is a schematic diagram of a computer system according to an example implementation.

As a more specific example, FIG. 1 depicts a computer system 100, such as a computer system that may be used as part of a DBMS. In accordance with example implementations, the computer system 100 includes a physical machine 120 that includes hardware and software components. As examples, the physical machine 120 may be a desktop computer, a server, a client, a rack-based computer unit, and so forth.

In accordance with example implementations, the hardware components of the physical machine 120 include one or multiple processors 122 (e.g., one or multiple central processing units (CPUs), one or multiple CPU processing cores, and so forth); a memory 124; and a network interface card (NIC) 128. The physical machine 120 may contain various other hardware components that are not depicted in FIG. 1, such as accelerators, bridge chips, bus interfaces, input/output (I/O) devices, and so forth.

In general, the memory 124 contains non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) and/or non-volatile memory devices (e.g., flash memory devices, read only memory (ROM) devices and so forth).

In accordance with example implementations, the software components of the physical machine 120 include a query processor 139 that processes incoming database requests, or queries 130, to provide corresponding query results 131. In this context, a "query" represents a request to store, retrieve or modify data stored in a database, such as a database of a data collection 180. The physical machine 120 may have various other software components that are not depicted in FIG. 1, such as an operating system, device drives, firmware, libraries, and so forth.

The data collection 180 represents one multiple databases 184. It is noted that one or multiple of such databases 184 may be a distributed database, i.e., a database that is distributed on multiple computing and/or storage nodes.

In accordance with example implementations, the databases 184 may be relational databases that store data organized in tables, where the data of each table in organized in rows and columns; and the physical machine 120 may be used to form at least part of an RDBMS. In accordance with example implementations, the queries 130 may originate with physical machines 160 that are coupled to the physical machine 120 via network fabric 150. As examples, the queries 130 may correspond to query statements that are dynamically generated by applications that execute on the physical machines 160, may be generated by users specifically crafting the query statements by according to a particular query language construct (e.g., according to a SQL standard), may be generated by graphical user interfaces (GUIs) and/or command line interfaces of the physical machines 160 in response to users supplying parameters for the queries 130, and so forth.

As depicted in FIG. 1, the network fabric 150 may further couple the physical machine 120 (and query processor 139) to the data collection 180 so that the query processor 139 may, for a given query request 130, execute operations to perform the action(s) with the data collection 180 corresponding to the request 130. In general, the network fabric 150 may include components and use protocols that are associated with one or multiple types of communication networks, such as (as examples) Fiber Channel networks, iSCSI networks, ATA over Ethernet (AoE) networks, HyperSCSI networks, local area networks (LANs), wide area networks (WANs), global networks (e.g., the Internet), wireless networks, or any combination thereof.

In accordance with example implementations, one or multiple hardware processor(s) 122 execute machine executable instructions 125 (or "software") that are stored in the memory 124 to form components of the query processor 139, such as a parser engine 140 (or "parser"), optimizer engine 144 (or "optimizer") and execution engine 148 (or "executor"). In general, the parser engine 140 processes an incoming query 130 to identify the different elements of the query 130, such as keywords, commands, constants, parameters, relations, and so forth. The optimizer engine 144 determines a query plan for the query 130, which sets forth a sequence of operations to be performed; and the execution engine 148 executes the operations to provide the corresponding query result 131.

In accordance with example implementations, the optimizer engine 144 applies the efficient enumeration technique (as described above and further described herein) to determine an optimal join order for processing joins. As part of this processing, the optimizer engine 144 may modify, store and retrieve data 126 that is stored in the memory 124. In this manner, as examples, the data 126 may represent queries 130, query results 131, candidate substitutes, query plans, multijoin operators, join orders, parameters for enumerating join orders, intermediate parameters used in the processing of queries, and so forth.

In accordance with example implementations, in response to receiving or accessing a query 130 that contains a join, the query processor 139 (and more specifically, the optimizer engine 144) processes the query 130 using the efficient enumeration technique to determine a join order for processing the join. In accordance with example implementations, the join may be an inner join.

Figure 2:
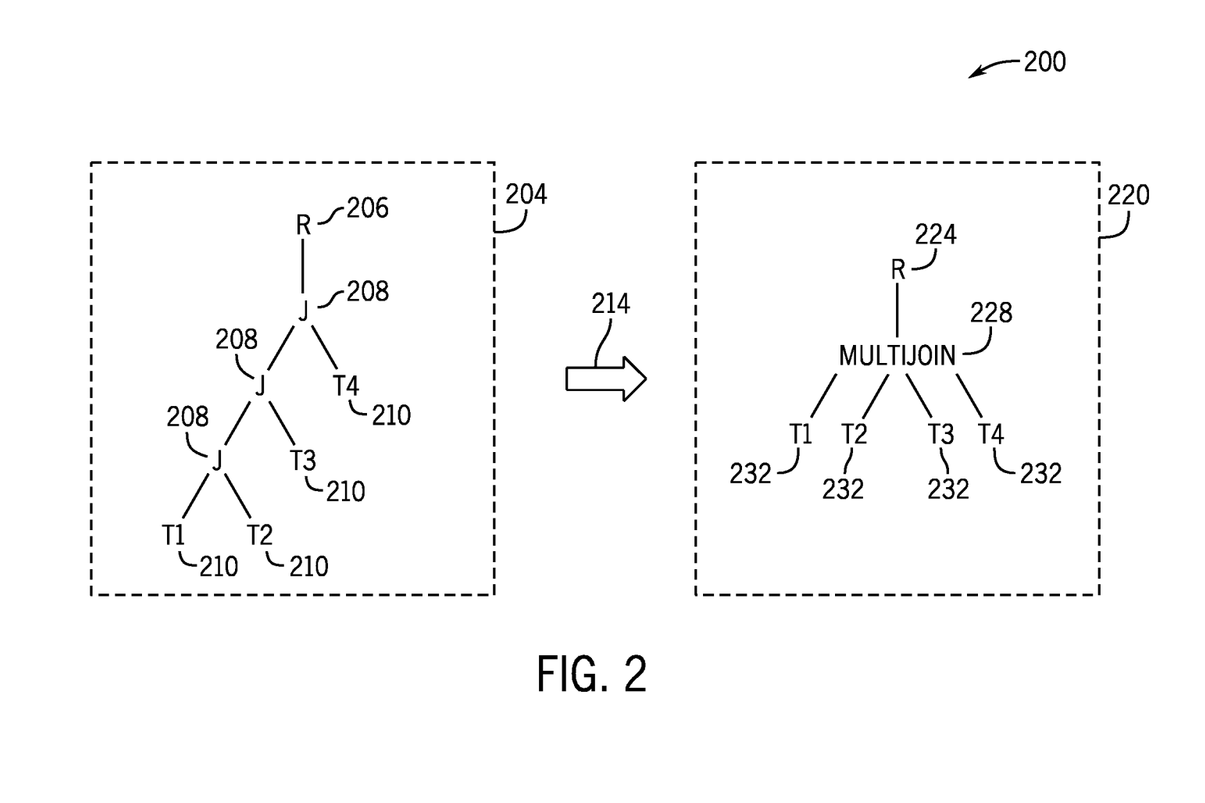
FIG. 2 is an illustration of a transformation of a relational expression tree having multiple single join operators into another relational expression tree having a multijoin operator according to an example implementation.

A join, such as an inner join, may be represented by a corresponding relational expression tree. For example, the query 130 may correspond to a SQL query statement that sets forth an inner join of four tables T1, T2, T3 and T4. FIG. 2 depicts one of many potential relational expression trees 204 (out of the possible twenty-four trees) for the example inner join. Referring to FIG. 2, the relational expression tree 204 has a root node 206, and the relational expression tree 204 has single join nodes 208 that propagate from the root node 206, as depicted in FIG. 2, to join corresponding table nodes 210. It is noted that the inner join may be alternatively expressed as other relational expression trees corresponding to different join orders.

Referring to FIG. 2 in conjunction with FIG. 1, in accordance with example implementations that are described herein, the optimizer engine 144 transforms a relational expression trees having single join nodes (such as the relational expression tree 204) into a relational expression tree that contains a multijoin operator that replaces the single join nodes. In this context, a "multijoin operator" refers to a relational expression tree operator that represents three or more single join operators.

More specifically, for the example in FIG. 2, in accordance with example implementations, the optimizer engine 144 transforms (as depicted at reference numeral 214) the relational expression tree 204 into a relational expression tree 220 that contains a multijoin operator 228 that represents all of the single join operators 208 of the tree 204. In particular, the relational expression tree 220 has a root node 224, which is connected to a multijoin operator 228 that replaces the single joins of the relational expression tree 204. The multijoin operator 228 for this example represents the inner join of tables T1, T2, T3 and T4. It is noted that at this point, no join order has been selected, as the tables T1, T2, T3 and T4 may be joined in twenty-four possible ways. However, the creation of the relational expression tree 220 with the multijoin operator 228 initializes the efficient enumeration technique, which determines an optimal join order.

In accordance with example implementations, the optimizer engine 144 determines an optimal join order based on two principles: 1. the total number of records a query returns (i.e., the number of records returned by the query result 131) remains constant, irrespective of the join order that is chosen; and 2. the performance of the query may be improved by reducing the data flow (i.e., reducing the records returned) between the various operators in the query plan. Applying these principles, the optimizer engine 144 applies an efficient enumeration technique 300 that is depicted in FIG. 3 to identify an optimal join.

Figure 3:
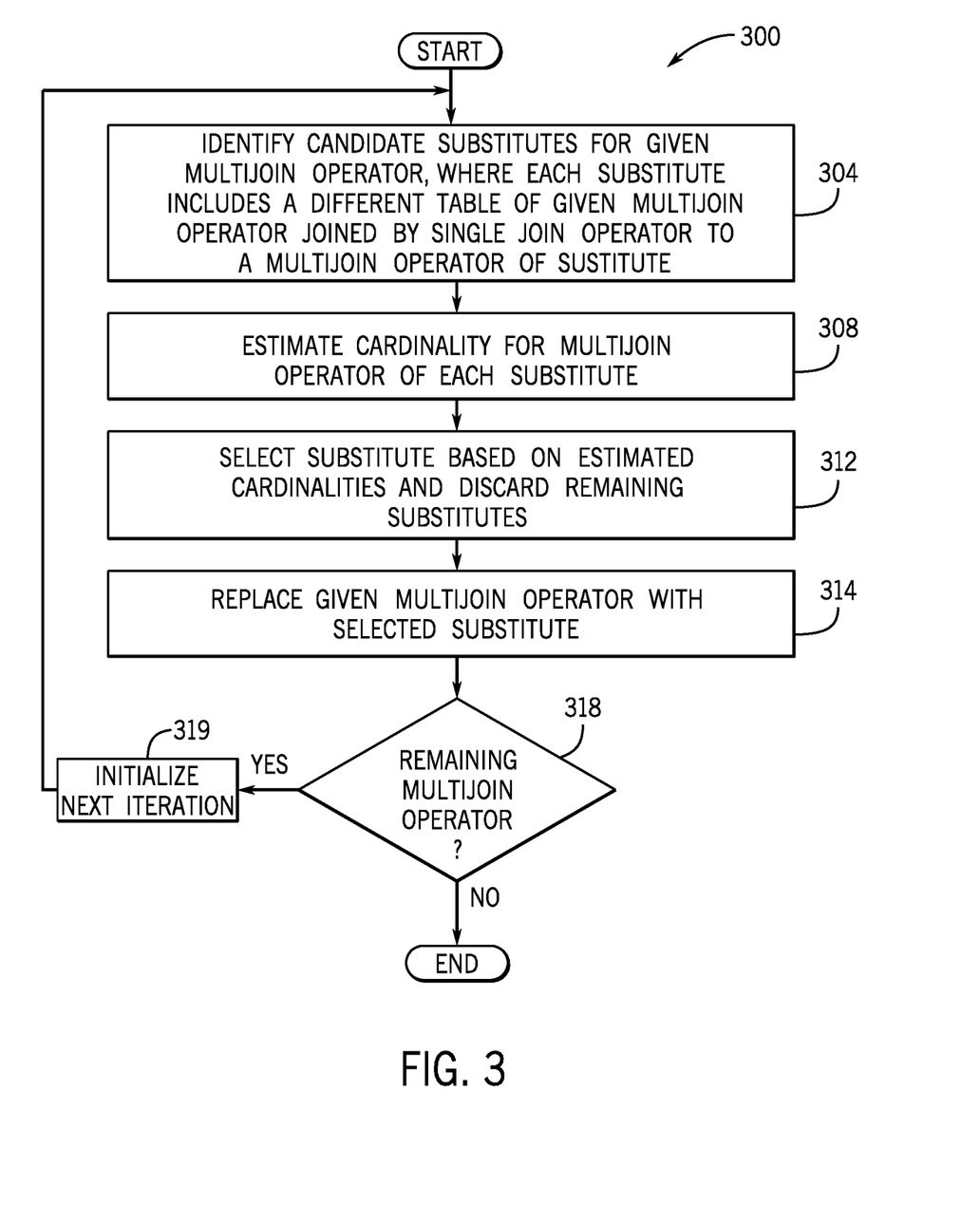
FIG. 3 is a flow diagram depicting a technique to determine a join order according to an example implementation.

More specifically, referring to FIG. 3 in conjunction with FIG. 1, in accordance with example implementations, the optimizer engine 144 identifies (block 304) candidate substitutes for a given multijoin operator. In this manner, each substitute corresponds to a relational expression tree in which a different table is removed from the given multijoin operator to create a multijoin operator for the substitute, and the multijoin operator for the substitute is joined by a single join operator to the removed table.

Figure 4:
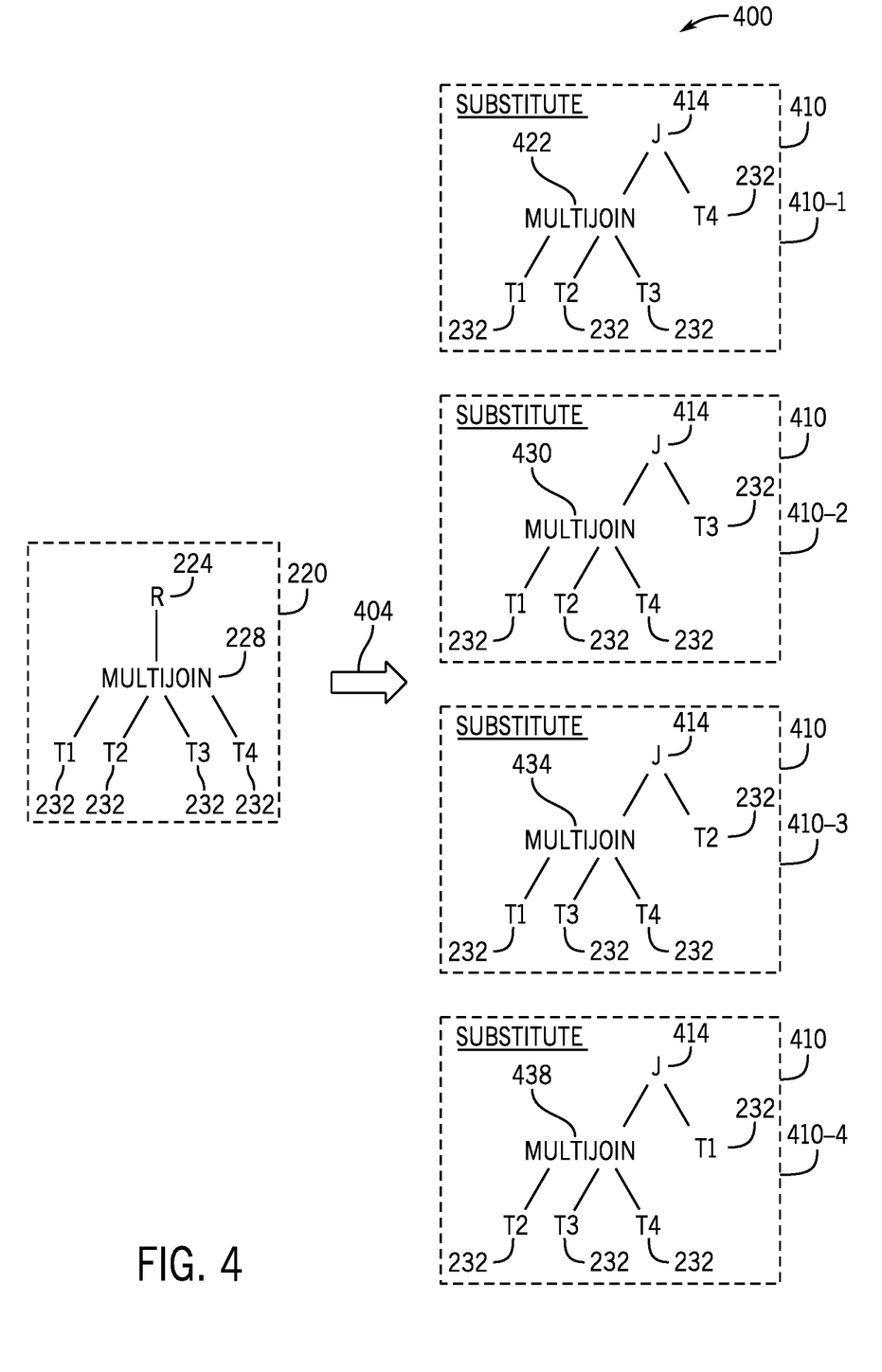
FIG. 4 is an illustration of a transformation of a relational expression tree having a multijoin operator into candidate substitutes according to an example implementation.

The number of candidate substitutes corresponds to the number of tables of the given multijoin operator. Four substitutes 410 (specifically substitutes 410-1, 410-2, 410-3 and 410-4) for the relational expression tree 220 are depicted in FIG. 4 for purposes of illustrating an example of how the optimizer engine 144 identifies candidate substitutes. More specifically, referring to FIG. 4, in conjunction with FIGS. 1 and 3, the optimizer engine 144 may transform 404 the relational expression tree 220 of FIG. 2 into four equivalent candidate substitutes 410-1, 410-2, 410-3 and 410-4 (where the reference numeral "410", in general, denotes any one of the candidates). For each substitute candidate 410, a different table 232 is removed from the multijoin operator 228 of the tree 220 to form a resulting multijoin operator, and the multijoin operator is joined by a single join operator 414 to the removed table 232.

More specifically, for the candidate substitute 410-1, table T4 is removed from the multijoin operator 228 to form a multijoin operator 422 representing a join of tables T1, T2 and T3. The table T4 is joined by a single join operator 414 to the multijoin operator 422. For the candidate substitute 410-2, table T3 is removed from the multijoin operator 228 to form a multijoin operator 430 representing a join of tables T1, T2 and T4. The table T3 is joined by a single join operator 414 to the multijoin operator 430. For the candidate substitute 410-3, table T2 is removed from the multijoin operator 228 to form a multijoin operator 434 representing a join of tables T1, T3 and T4. The table T2 is joined by a single join operator 414 to the multijoin operator 434. For the candidate substitute 410-4, table T1 is removed from the multijoin operator 228 to form a multijoin operator 438 representing a join of tables T2, T3 and T4. The table T1 is joined by a single join operator 414 to the multijoin operator 438.

In accordance with example implementations, while performing the transformation to identify the candidate substitutes, the query optimizer engine 144 performs checks to ensure that the potential substitutes are semantically valid. Semantically invalid substitutes, therefore, in accordance with example implementations are not considered by the query optimizer engine 144 for further enumeration.

Although the candidate substitutes 410 may be equivalent relational expression trees, the multijoin operators of each of these candidate substitutes 410 may return different number of records, or rows, in the processing of the candidates 410. Therefore, pursuant to block 308 of FIG. 3, the optimizer engine 144 estimates (block 308) a cardinality of each of the substitutes. In other words, in accordance with example implementations, the optimizer engine 144 estimates the number of results, such as the number of records, or rows, that are returned in the processing of the multijoin operator of each candidate. The estimation of the cardinality may be determined from query statistics, as can be appreciated by one of ordinary skill in the art and may be performed one of a number of different ways.

Pursuant to block 312 of FIG. 3, the optimizer engine 144 selects one of the candidate substitutes based on the estimated cardinalities. In this regard, in accordance with example implementations, the optimizer engine 144 selects the candidate substitute that has the lowest corresponding cardinality, i.e., the substitute that is estimated to produce the least number of rows in the processing of the corresponding multijoin operator. As also depicted in block 312, in accordance with example implementations, the optimizer engine 144 discards the remaining candidate substitutes (e.g., deallocates memory that had been allocated to the discarded candidate substitutes), thereby freeing up memory for further processing of the enumeration technique 300.

Thus, to summarize, applying the first principle stated above, the cardinality of each of the generated candidate substitutes remain the same. In other words, the cardinality of join (multijoin (T1, T2, T3), T4) is the same as the cardinality of join (multijoin (T1, T2, T4), T3), and so forth. However, the cardinalities of the multijoins of the candidate substitute vary. For example, the cardinality of multijoin (T1, T2, T3) may not be the same as multijoin (T1, T2, T4) and so on. Therefore, applying the second principle stated above, the multijoin of the candidate substitute, which returns the least number of results (e.g., rows) is identified and preserved for further enumeration. Therefore, still referring to FIG. 3, pursuant to the technique 300, the given multijoin operator is replaced with the selected substitute, pursuant to block 314. In other words, for the example depicted in FIG. 4, the relational expression tree 220 is replaced with the candidate substitute 410-1, 410-2, 410-3 or 410-4, whose multijoin operator has the smallest estimated cardinality.

Pursuant to decision block 318, the optimizer engine 144 determines if there is a remaining multijoin operator remaining in the selected substitute, and if so, another iteration of the processing loop is performed by initializing (block 319) for another iteration, or enumeration, and returning to block 304. Otherwise, if the candidate substitute has no more multijoin operators, the optimal join order has been determined.

Determining the join order using the efficient enumeration technique that is set forth herein saves memory and computing resources. For example, at the first level of enumeration, there are n possibilities, and at the second level of enumeration (i.e., iteration number two), n−1 possibilities are considered, and so forth. As such, the optimal join order may be determined by exploring less than the sum of an arithmetic progression. This is significantly cheaper, as compared to n! enumerations for considering all possible join orders.

Figure 5:
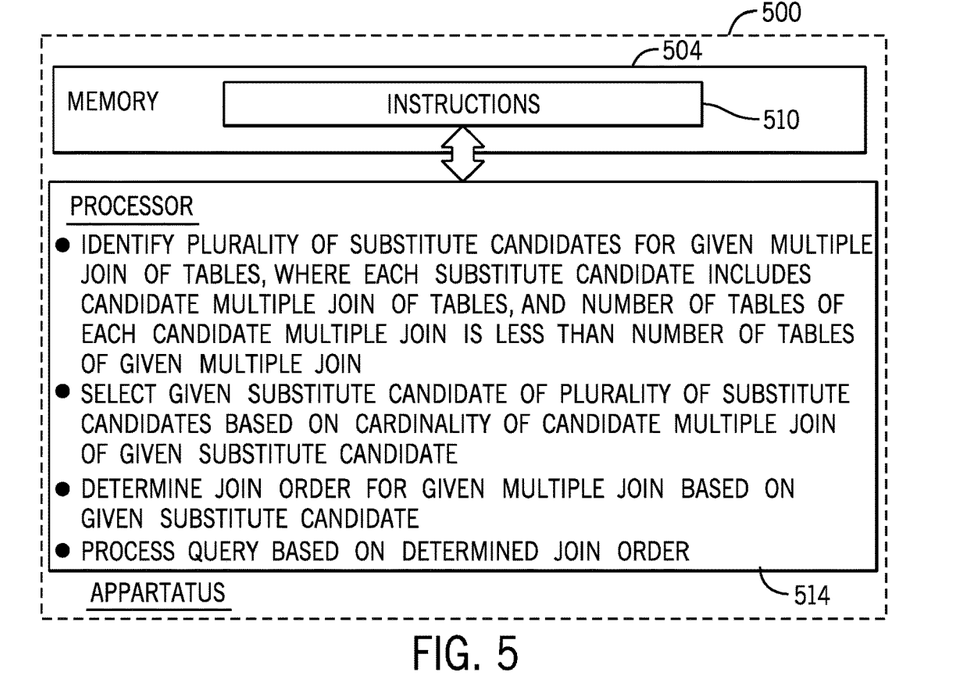
FIG. 5 is a schematic diagram of an apparatus to determine a join order for a multiple join and process a query based on the join order according to an example implementation.

Referring to FIG. 5, in accordance with example implementations, an apparatus 500 includes a processor 514 and a memory 504. The memory 504 stores instructions 510 that, when executed by the processor 514, cause the processor 514 to identify a first plurality of substitute candidates for a given multiple join of tables. Each substitute candidate includes a candidate multiple join of tables, and the number of tables of each candidate multiple join is less than the number of tables of the given multiple join. The instructions 510, when executed by the processor 514, further cause the processor 514 to select a given substitute candidate based on a cardinality of the candidate multiple join of the given substitute candidate; determine a join order for the given multiple join based on the given substitute candidate; and process the query based on the determined join order.

Figure 6:
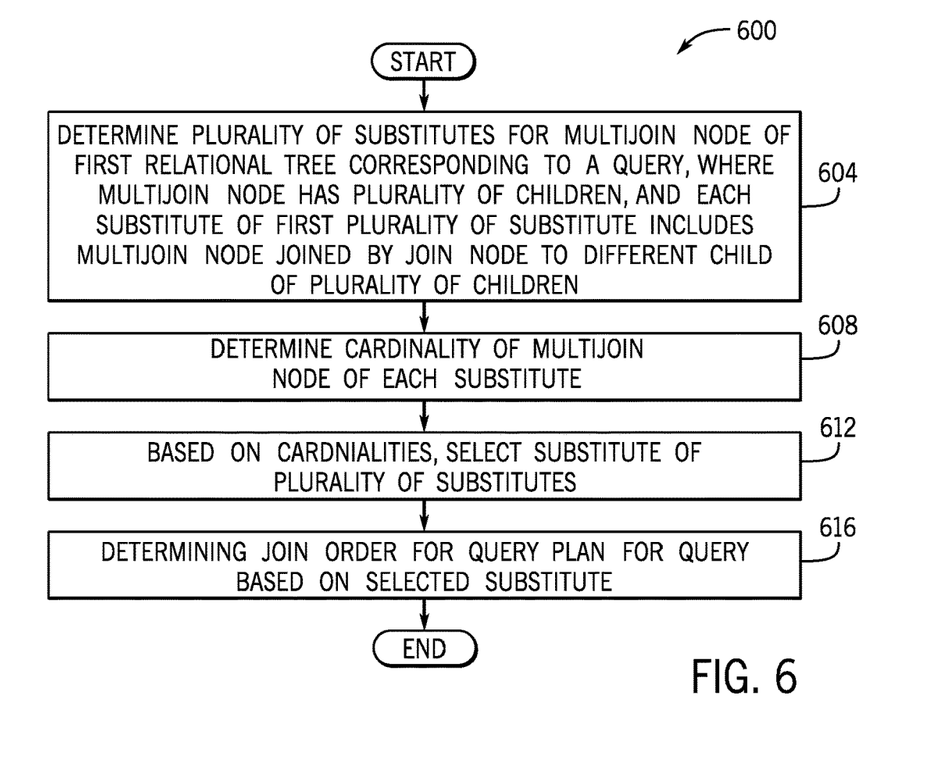
FIG. 6 is a flow diagram depicting a process to determine a join order for a query plan for a query that has a corresponding multijoin node according to an example implementation.

Referring to FIG. 6, in accordance with example implementations, a process 600 may be performed by at least one hardware processor. The process 600 includes determining (block 604) a first plurality of substitutes for a multijoin node of a first relational tree corresponding to a query. The multijoin node has a plurality of children, and each substitute of the first plurality of substitutes includes a multijoin node joined by a join node to a different child of the plurality of children. The technique 600 includes determining (block 608) a first cardinality for the multijoin node of each substitute; based on the first cardinalities, selecting (block 612) a substitute of the first plurality of substitutes; and determining (block 616) a join order for a query plan for the query based on the selected substitute.

Figure 7:
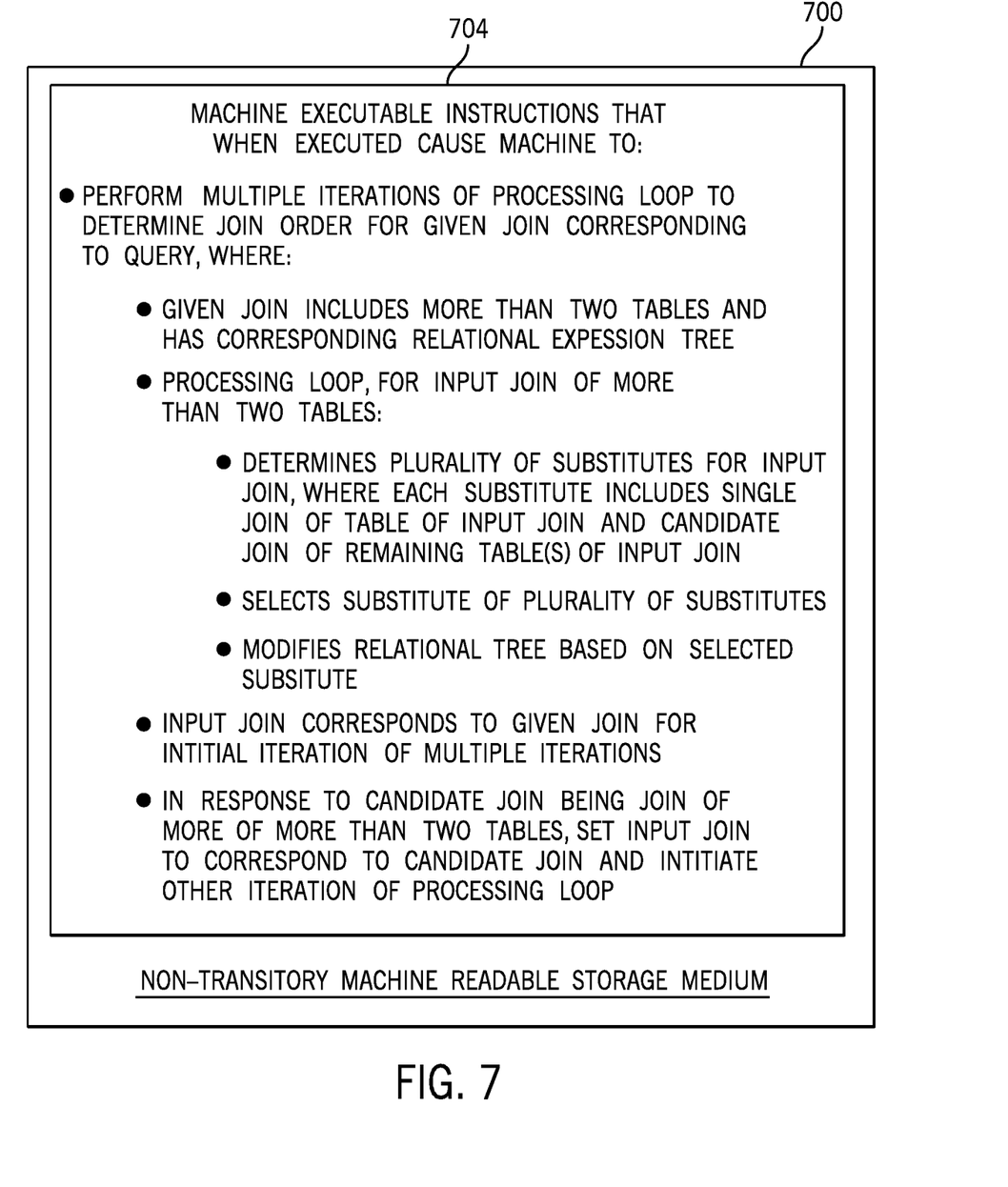
FIG. 7 is an illustration of machine executable instructions stored on a non-transitory machine-readable storage medium to cause a machine to perform multiple iterations of a processing loop to determine a join order according to an example implementation.

Referring to FIG. 7, in accordance with example implementations, a non-transitory machine readable storage medium 700 stores instructions 704 that, when executed by a machine, cause the machine to perform multiple iterations of a processing loop to determine a join order for a given join corresponding to a query. The given join includes more than two tables and has a corresponding relational expression tree. The processing loop, for an input join of more than two tables, determines a plurality of substitutes for the input join, where each substitute includes a single join of a table of the input join and a candidate join of the remaining table(s) of input joins; selects a substitute of the plurality of substitutes; and modifies the relational tree based on the selected substitute. The input join corresponds to the given join for an initial iteration of the multiple iterations; and in response to the candidate join being a join of more than two tables, set the input join to correspond to the candidate join and initiate another iteration of the processing loop.

In accordance with example implementations, a plurality of cardinalities is determined corresponding to the candidate multiple joins and including the cardinality of a multiple join of the given substitute candidate. The substitute candidate is selected based on the plurality of cardinalities. A particular advantage is that the number of authorizations that are processed for a multiple join may be reduced.

In accordance with example implementations, the given substitute candidate may be selected based on the cardinality of the candidate multiple join being lower than the other cardinalities of the plurality of cardinalities. A particular advantage is that the number of authorizations that are processed for a multiple join may be reduced.

In accordance with example implementations, a potential substitute candidate may be evaluated to determine if the potential substitute candidate is semantically valid, and the potential substitute candidate may be included in the plurality of substitute candidates based on the evaluation. The particular advantage is that incorrect results may be avoided.

In accordance with example implementations, the identification of the substitute candidates may be repeated by substituting the given multiple join with the given substitute candidate to identify a second plurality of substitute candidates; and a given substitute candidate of the second plurality of substitute candidates may be selected. The query may be processed based on the given substitute candidate of the second plurality of substitute candidates. A particular advantage is that the number of join orders considered may be significantly reduced, thereby optimizing the computing and memory resources that are used to determine the optimal join order.

In accordance with example implementations, data may be stored in memory representing the plurality of substitute candidates; and in response to the selection of the given substitute candidate, a portion of the memory may be deallocated corresponding to a part of the memory in which the data corresponding to the substitute candidates other than the selected substitute is stored. A particular advantage is that memory resource consumption may be reduced in the determination of the optimal join order.

While the present disclosure has been described with respect to a limited number of embodiments, those skilled in the art, having the benefit of this disclosure, will appreciate numerous modifications and variations therefrom. It is intended that the appended claims cover all such modifications and variations.

What is claimed is:
1. An apparatus comprising:
 a processor; and
 a memory to store instructions that, when executed by a processor, cause the processor to:
  determine a join order for a relational expression tree specified by a query, wherein the relational expression tree comprises a multiple join operator to join at least three tables, the determination of the join order comprises performing a plurality of successive itera- tions, and the determination of the join order comprises, in a given iteration of the plurality of successive iterations:
identifying a first plurality of substitute candidates for the given multiple join operator, wherein each substitute candidate of the first plurality of substitute candidates comprises a multiple join operator and at least one single join operator;
determining a cardinality of the multiple join operator of each substitute candidate of the first plurality of substitute candidates;
selecting a first substitute candidate of the first plurality of substitute candidates based on the cardinality of the multiple join operator of the first substitute candidate;
responsive to the selection of the first substitute candidate, replacing the given multiple join operator with the first substitute candidate in the relational expression tree; and
responsive to the selection of the first substitute candidate, excluding the remaining substitute candidate or substitute candidates of the first plurality of substitute candidates other than the first substitute candidate from the remaining iteration or iterations of the plurality of successive iterations after the given iteration; and
process the query based on the join order.

2. The apparatus of claim 1, wherein the instructions, when executed by the processor, further cause the processor to select the first substitute candidate based on the cardinality of the multiple join operator of the first substitute candidate being lower than the other cardinalities of the remaining substitute candidate or substitute candidates.

3. The apparatus of claim 1, wherein the instructions, when executed by the processor, further cause the processor to evaluate a potential substitute candidate to determine if the potential substitute candidate is semantically valid, and include the potential substitute candidate in the first plurality of substitute candidates based on the evaluation.

4. The apparatus of claim 1, wherein the instructions, when executed by the processor, further cause the processor to optimize the query based on characteristics of the query not related to the given multiple join.

5. The apparatus of claim 1, wherein the instructions, when executed by the processor, further cause the processor to:
store data in a memory representing the first plurality of substitute candidates; and
in response to the selection of the first substitute candidate, deallocate a portion of the memory corresponding to the remaining substitute candidate or substitute candidates of the first plurality of substitute candidates.

6. A method comprising:
determining a join order for a relational expression tree specified by a query, wherein the relational expression tree comprises a multiple join operator to join at least three tables, the determination of the join order comprises performing a plurality of successive iterations, and the determination of the join order comprises, in a given iteration of the plurality of successive iterations:
identifying a first plurality of substitute candidates for the given multiple join operator, wherein each substitute candidate of the first plurality of substitute candidates comprises a multiple join operator and at least one single join operator;
determining a cardinality of the multiple join operator of each substitute candidate of the first plurality of substitute candidates;
selecting a first substitute candidate of the first plurality of substitute candidates based on the cardinality of the multiple join operator of the first substitute candidate;
responsive to the selection of the first substitute candidate, replacing the given multiple join operator with the first substitute candidate in the relational expression tree; and
responsive to the selection of the first substitute candidate, excluding the remaining substitute candidate or substitute candidates of the first plurality of substitute candidates other than the first substitute candidate from the remaining iteration or iterations of the plurality of successive iterations after the given iteration; and
processing the query based on the join order.

7. The method of claim 6, wherein determining the join order further comprises processing the first substitute candidate through at least one additional iteration of the plurality of successive iterations to determine a second substitute candidate for the first substitute candidate.

8. The method of claim 6, further comprising:
storing data in a memory representing the first plurality of substitutes; and
in response to the selection of the first candidate substitution, erasing data corresponding to the remaining substitute candidate or substitute candidate of the first plurality of substitute candidates.

9. The method of claim 6, wherein determining the first plurality of substitutes comprises, for each candidate substitute of a set of candidate substitutes, determining whether the candidate substitute is semantically valid and based on the determination of whether the candidate substitute is semantically valid, adding the candidate substitute to the first plurality of substitute candidates.

10. A non-transitory machine readable storage medium that stores instructions that, when executed by a machine, cause the machine to:
determine a join order for a relational expression tree specified by a query, wherein the relational expression tree comprises a multiple join operator to join at least three tables, the determination of the join order comprises performing a plurality of successive iterations, and the determination of the join order comprises, in a given iteration of the plurality of successive iterations:
identifying a first plurality of substitute candidates for the given multiple join operator, wherein each substitute candidate of the first plurality of substitute candidates comprises a multiple join operator and at least one single join operator;
determining a cardinality of the multiple join operator of each substitute candidate of the first plurality of substitute candidates;
selecting a first substitute candidate of the first plurality of substitute candidates based on the cardinality of the multiple join operator of the first substitute candidate;
responsive to the selection of the first substitute candidate, replacing the given multiple join operator with the first substitute candidate in the relational expression tree; and
responsive to the selection of the first substitute candidate, excluding the remaining substitute candidate or substitute candidates of the first plurality of substitute candidates other than the first substitute candidate from the remaining iteration or iterations of the plurality of successive iterations after the given iteration; and process the query based on the join order.

11. The storage medium of claim 10, wherein the instructions, when executed by the machine, further cause the machine to, in response to the first substitute candidate being a join of less than three tables, end the plurality of successive iterations.

12. The storage medium of claim 10, wherein the instructions, when executed by the machine, further cause the machine to:

for each substitute candidate of the first plurality of substitute candidates, determine a number of rows returned due to processing of the substitute candidate; and select the first substitute candidate based on the determined numbers of rows.

13. The storage medium of claim 12, wherein the instructions, when executed by the machine, further cause the machine to determine the number of rows based on histogram statistics.

14. The storage medium of claim 10, wherein the instructions, when executed by the machine, further cause the machine to:

store data in a memory representing the first plurality of substitute candidates; and in response to the selection of the first substitute candidate, deallocate a portion of the memory corresponding to the remaining substitute candidate or substitute candidates of the first plurality of substitute candidates.

15. The storage medium of claim 10, wherein the number of the candidate substitutes of the first plurality of candidate substitutes is equal to or less than the number of tables joined by the given multiple join operator.

16. The storage medium of claim 10, wherein the instructions, when executed by the machine, further cause the machine to evaluate a potential substitute to determine if the potential substitute is semantically valid, and include the potential substitute in the plurality of candidate substitutes based on the evaluation.

* * * * *